United States Patent Office 3,184,420
Patented May 18, 1965

3,184,420
POLYURETHANE FOAMS FROM POLYESTERS OF EPOXY ACIDS
Karl Brack, Wilmington, Del., assignor to Hercules Powder Company, Wilmington, Del., a corporation of Delaware
No Drawing. Filed Dec. 28, 1962, Ser. No. 247,843
8 Claims. (Cl. 260—2.5)

This invention relates to polyurethane foams and to their preparation. More particularly, the invention relates to polyurethane foams prepared from linear polymeric esters and polyisocyanates.

It is known in the art to prepare polyurethanes from polyols and isocyanates. The reaction can be shown as follows:

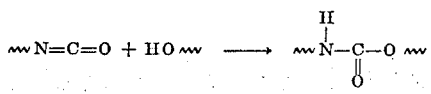

The polymers take their name from the urethane linkages formed. Depending on the nature of the reactants and the process used, the resulting polymer can take one of several forms, such as foams, synthetic rubbers, adhesives, coatings, fibers, molding compounds, etc. Even in the relatively narrow field of polyurethane foams, there are a large number of known reactants and processes. The polyols known in the prior art can be employed in one or two of the conventional methods for preparing foams but no single polyol has been found with universal applicability, i.e., none of the prior art polyols can be used in all of the methods for the preparation of polyurethane foams. For example, it has not been possible in the past to prepare polyurethane foams from ester polyols by the least expensive process, i.e., the so-called "one-shot" method. In addition, the polyurethane foams of the prior art suffer from shrinkage and are not resistant to humid aging.

It has now been discovered that certain linear polymeric esters can be used in the preparation of polyurethane foams by all of the conventional methods and particularly for the preparation of rigid urethane foams by the "one-shot" process. The resulting foams are free from shrinkage and are resistant to humid aging.

Accordingly, the present invention relates to polyurethane foams comprising the foamed reaction product of an organic polyisocyanate and a polyol containing at least 10%, most preferably 25%, by weight of a linear polymeric ester having the general formula:

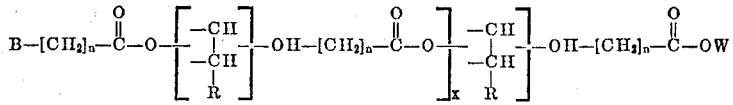

in which R is a substituent of the group consisting of hydrogen and alkyl radicals; n is a whole number from 0 to 20, inclusive; x is at least 1; W is a substituent of the group consisting of hydrogen, hydroxyalkyl radicals and halohydroxyalkyl radicals; and B is a substituent of the group consisting of R—CH——CH-radicals, R—CH—CH-radicals, and R—CH—CH-radicals
     \\O/                 |    |                      |    |
                          X   OH                    OH   X in which R has the same significance as set forth above and X is a substituent of the group consisting of halogen radicals and acyloxy radicals.

In accordance with this invention, polyurethane foams are prepared by mixing and reacting the following basic ingredients: a linear polymeric ester as defined above, an organic polyisocyanate, one or more catalysts, one or more blowing agents, and a surfactant. Reaction usually occurs at room temperature spontaneously and follows several courses concurrently and consecutively. The hydroxyl groups of the polymeric ester react with the polyisocyanate to give polymer chain lengthening and cross-linking by formation of urethane groups. If water is the blowing agent, the polyisocyanate reacts with it to give an amine and carbon dioxide gas (which blows the cellular structure). The amine further reacts with more isocyanate to give urea groups. The urea groups will also react with isocyanate to give biuret groups. If a low boiling liquid, e.g., trichlorofluoromethane, is the blowing agent, the cellular structure is attained through vaporization of this liquid by the heat of reaction.

The polymeric esters employed in accordance with the instant invention are linear polyesters having a plurality of OH substituent groups attached at regular intervals along the polymer chain and which may or may not be terminated with epihalohydrin or alkylene oxide end groups. The preparation of the linear polymeric esters and end termination is fully described in my copending parent patent application, Serial No. 141,020, filed September 27, 1961. As stated therein, the polymeric esters are prepared by heating either an epoxidized aliphatic acid or a halohydrated saturated aliphatic acid or mixture thereof with or without a basic catalyst. The simplest epoxidized aliphatic acid is epoxypropionic acid,

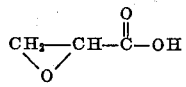

Other typical epoxidized saturated aliphatic acids include by way of example, 2,3-epoxybutyric acid; 3,4-epoxybutyric acid; 2,3 - epoxyhexanoic acid; 3,4 - epoxyhexanoic acid; 5,6-epoxyhexanoic acid; 2,3-epoxyoctanoic acid; 5,6-epoxyoctanoic acid; 7,8-epoxyoctanoic acid; 2,3-epoxyundecanoic acid; 5,6-epoxyundecanoic acid; 10,11-epoxyundecanoic acid; 2,3-epoxyhexadecanoic acid; 7,8-epoxyhexadecanoic acid; 15,16 - epoxyhexadecanoic acid; 2,3-epoxyoctadecanoic acid; 9,10 - epoxyoctadecanoic acid; 10,11 - epoxyoctadenoic acid; 11,12 - epoxyoctadecanoic acid; 12,13-epoxyoctadecanoic acid; 17,18-epoxyoctadecanoic acid, and the like. Typical halohydrated saturated aliphatic acids include by way of example, 2(3)-chloro-3(2)-hydroxybutyric acid; 3(4) - bromo - 4(3) - hydroxybutyric acid; 2(3)-iodo-3(2)-hydroxyhexanoic acid; 3(4)-chloro-4(3) - hydroxyhexanoic acid; 5(6) - chloro - 6(5)-hydroxyoctanoic acid; 7(8)-bromo-8(7)-hydroxyoctanoic acid; 2(3)-chloro-3(2)-hydroxyhexadecanoic acid; 7(8)-iodo - 8(7) - hydroxyhexadecanoic acid; 15(16) - chloro-16(15) - hydroxyhexadecanoic acid; 2(3) - chloro - 3(2)-hydroxyoctadecanoic acid; 9(10)-chloro-10(9)-hydroxyoctadecanoic acid; 10(11)-chloro - 11(10) - hydroxyoctadecanoic acid; 11(12)-chloro - 12(11) - hydroxyoctadecanoic acid; 12(13) - chloro - 13(12) - hydroxyoctadecanoic acid; 17(18)-bromo - 18(17) - hydroxyoctadecanoic acid; and the like. Those polymeric esters prepared from epoxidized aliphatic acids such as 9,10-epoxystearic acid are most preferred. If end termination is desired, a chain terminator (epihalohydrin or alkylene oxide) can be added during the polymerization.

The polymeric esters can be blended with one or more polyols before reaction with the polyisocyanate to vary the frequency of OH groups in the polymers being used and thereby vary the rigidity or flexibility of the foam to be prepared. The only limitation on such blends is that the resulting blends contain at least 10% by weight of the linear polymeric ester. Exemplary of the polyols which can be used in such blends are: triisopropanolamine, poly(propylene oxide), polyester polyols, [N,N,N',N'-tetrakis(2-hydroxypropyl)] ethylene diamine, propylene oxide adducts of sorbitol in which the sorbitol to propylene oxide molar ratio is from 1:6 to 1:24, propylene oxide adducts of trimethylolpropane in which the trimethylolpropane to propylene oxide molar ratio is from 1:3 to 1:36, propylene oxide adducts of pentaerythritol in which the pentaerythritol to propylene oxide molar ratio is from 1:4 to 1:8, etc.

Any organic polyisocyanate can be employed in accordance with the instant invention. Most preferably, the isocyanate will be an aromatic polyisocyanate. Examples of the polyisocyanates which can be employed include: polymethylene diisocyanates such as ethylene diisocyanate, trimethylene diisocyanate, dodecamethylene diisocyanate, hexamethylene diisocyanate, tetramethylene diisocyanate, pentamethylene diisocyanate; alkylene diisocyanates such as propylene-1,2-diisocyanate, 2,3-dimethyl tetramethylene diisocyanate, butylene-1,2-diisocyanate, butylene-1,3-diisocyanate; alkylidene diisocyanates such as ethylidene diisocyanate and heptilidene diisocyanate; cycloalkylene diisocyanates such as 1,4-diisocyantocyclohexane, cyclopentanyl-1,3-diisocyanate; aromatic polyisocyanates such as m-phenylene diisocyanate, p-phenylene diisocyanate, 1-methylphenyl-2,4-diisocyanate, naphthalene-1,4-diisocyanate, naphthalene-1,5-diisocyanate, o,o'-toluene diisocyanate, diphenyl-4,4'-diisocyanate, benzene-1,2,4-triisocyanate, xylylene-1,4-diisocyanate, xylylene-1,3-diisocyanate, 4,4'-diphenylenemethane diisocyanate, 1-chlorophenyl-2,4-diisocyanate, 4,4'-diphenylene propane diisocyanate; and aliphatic-aromatic diisocyanates such as methylene bis(4-phenyl)diisocyanate, phenylethylene diisocyanate, polymethylene polyphenylisocyanate, etc. Theoretically, there should be sufficient isocyanate groups present to react with all of the OH groups of the polymeric ester. In practice, however, there can be considerable variation in the ratio of the two reactants. Normally one would not use a great excess of polyisocyanate since it is by far the more expensive reactant. An excess of polymeric ester over polyisocyanate can, and many times is used.

The catalyst used in the process of this invention generally comprises a mixture of a tertiary amine such as triethylenediamine, tetramethylbutanediamine, triethylamine, triethanolamine, N-methylmorpholine, N,N'-diethylpiperazine, N,N-dimethylhexahydroaniline, tribenzylamine, N,N-dimethylbenzylamine, etc., with a metal compound such as stannous octoate, zinc octoate, dibutyl tin dilaurate, ferric acetylacetonate, etc. While a mixed catalyst is generally used, it is to be understood that the process can be carried out with any of the above-mentioned catalysts used singly. The amount of catalyst can be varied over a wide range, but in general, the tertiary amines will be used in amounts of from about 0.1% to about 1.0%, by weight, and the metal compounds in an amount of from about 0.1% to about 1.0%, by weight, based on total ingredients.

Any of the conventional blowing agents for polyurethane foams can be used in accordance with the procedure of this invention. The specific blowing agent used will depend upon the desired utility of the foam. The conventional, and probably the most widely used, blowing agent is water. The water reacts with the isocyanate groups to form substituted urea linkages, thus generating carbon dioxide which actually does the blowing. In another category are the low boiling liquid blowing agents such as pentane, isobutylene, trichlorofluoromethane, dichlorodifluoromethane, dichlorotetrafluoroethane, etc. Here blowing is attained through vaporization of the liquid by the heat of reaction. A combination of both water and a low boiling liquid can also be used to blow the foams. The use of halogenated hydrocarbon low-boiling liquids are particularly advantageous in the preparation of rigid polyurethane foams for thermal insulation since they have low thermal conductivity values.

Any surfactant, i.e., emulsifier, which is inert to the reaction, can be used in the process of this invention. Exemplary of the surfactants that can be used are dioctylsodium sulfosuccinate, water-soluble polyethylene ethers of fatty acids, silicone surfactants, etc. Most preferred are the nonionic silicone surfactants. The concentration of surfactant controls the size and uniformity of cells in the foam since it reduces the surface tension of the gas bubble during the foaming process and will usually be from about 0.1% to about 1.0%, by weight based on total ingredients.

As mentioned above, there are several conventional methods used in the preparation of polyurethane foams. These methods fall into three general categories:

(1) *The full prepolymer method.*—In this method, the polymeric ester is prereacted with an excess of polyisocyanate; normally a 10% excess of polyisocyanate is maintained. To form the foam, a mixture of blowing agent, surfactant, and catalyst (called "activator solution" in trade jargon) is mixed with the prepolymer. The most difficult point in this, as in most methods of preparation, is the balancing of the foaming and cross-linking reactions so that by the time the foam has reached its full height it will be strong enough to retain the gas generated.

(2) *Quasi-prepolymer method.*—Here, a portion of the polymeric ester is reacted with all of the polyisocyanate so as to maintain an NCO/OH (molar ratio) of from about 4 to about 6. To form the foam, the quasi-prepolymer is mixed with the remainder of the polymeric ester, a surfactant and catalyst. The required blowing agent can be added to the quasi-prepolymer, the remainder of the polymeric ester or it can be added separately, depending on which blowing agent is used. If water is used, it can be added to the remainder of the polymeric ester or separately. If a low boiling liquid is used, it can be added to the quasi-prepolymer, the remainder of the polymeric ester or it can be separately added.

(3) *The one-shot method.*—This, as the name implies, consists of mixing all the components at once and allowing them to react. In practice, the number of components is usually reduced by mixing nonreactive ones in advance.

The "froth" process is adaptable to all the above methods. In the "froth" process, all the ingredients for the foam are mixed in a chamber (mixing head) under pressure. By means of a pressure relief valve, the mixture is ejected to the atmosphere where it immediately expands to form a froth. This froth is stable enough to stand by itself until the cross-linking reactions have been completed. During the cross-linking, the froth usually expands further.

As stated above, the foams of this invention can be prepared by any of the conventional methods. In addition, it is to be noted that the foams can be produced in various forms, as slab stock, foamed in place to fill voids (e.g., truck wall insulation), sprayed directly onto a surface to which the foam will adhere, etc. Depending on the methods and ingredients used, the polyurethane foams can have many different properties and utilities as, for example, rigid urethane foams can be prepared as lightweight structural materials with many useful insulation and acoustical properties.

The following examples will better illustrate the nature of this invention. However, it is to be understood that the invention is not intended to be limited to these examples. Parts and percentages are by weight unless otherwise indicated.

*Examples 1 and 2*

Rigid polyurethane foams were prepared as follows. In each example, epichlorohydrin-terminated poly(9,10- epoxystearic acid), a polyisocyanate and a nonionic silicone surfactant were blended with an electric stirrer for 2 minutes. Then water and an amine catalyst were rapidly added and each mixture stirred at high speed for 10 seconds. Each mixture was then poured into a mold where it formed a rigid foam. Each foam was allowed to cure for 24 hours at room temperature before testing its physical properties. The amounts of ingredients used (parts by weight) in the preparation of each foam and the density, compressive strength and tensile strength of the resulting foams are tabulated below.

| Ingredients | Examples | |
|---|---|---|
| | 1 | 2 |
| Epichlorohydrin-terminated poly(9,10-epoxystearic acid) [1] | 100 | 100 |
| Toluene diisocyanate (80:20 mixture of 2,4 to 2,6-toluene diisocyanate) | 61.5 | 0 |
| Polymethylene polyphenylisocyanate (equivalent weight 133.8) | 0 | 100 |
| Nonionic silicone surfactant | 0.6 | 0.6 |
| Water | 2.9 | 2.9 |
| N,N,N',N'-tetramethyl-1,3-butanediamine | 0.6 | 0 |
| Triethylenediamine | 0 | 0.6 |
| PROPERTIES | | |
| Density, lbs./cu. ft. | 2.8 | 17.7 |
| Compressive strength (10% deflection), p.s.i. | 16 | 255 |
| Tensile strength, p.s.i. | 30 | 203.5 |
| Volume change,[2] percent | 0.5 | 0 |

[1] Acid number 0.3 and equivalent weight 249.8.
[2] Percentage volume change over a period of one week at a temperature of 100° C. and 100% relative humidity.

Each foam was composed of uniform closed cells. The foam of Example 1 could be used in the manufacture of toys. The foam of Example 2 could be used in the manufacture of building panels.

*Examples 3 and 4*

In these examples, rigid foams were prepared from different epichlorohydrin - terminated poly(9,10 - epoxystearic acids) by the following method. In each example, the epichlorohydrin-terminated poly (9,10 - epoxystearic acid), blowing agent, catalyst and surfactant were blended for 2 minutes. Then the toluene diisocyanate was added and each mixture was stirred at high speed for 10 seconds. Each mixture was then poured into a mold where it formed a rigid foam. Each foam was allowed to cure for 24 hours at room temperature before testing its physical properties. The amounts of ingredients used (parts by weight) in the preparation of each foam and the density, compressive strength and tensile strength of the resulting foams are tabulated below.

| Ingredients | Examples | |
|---|---|---|
| | 3 | 4 |
| Epichlorohydrin-terminated poly(9,10-epoxystearic acid) [1] | 100 | 0 |
| Epichlorohydrin-terminated poly(9,10-epoxystearic acid) [2] | 0 | 100 |
| Water | 3 | 0 |
| Trichlorofluoromethane | 25 | 25 |
| Stannous octoate | 0.17 | 0 |
| N,N,N',N'-tetramethyl-1,3-butanediamine | 1.2 | 1.0 |
| Nonionic silicone surfactant | 2.1 | 0.6 |
| Toluene diisocyanate (80:20 mixture of 2,4 to 2,6-toluene diisocyanate) | 65.5 | 38.4 |
| PROPERTIES | | |
| Density, lbs./cu. ft. | 1.6 | 5.9 |
| Compressive strength (10% deflection), p.s.i. | 3.1 | 22.6 |
| Tensile strength, p.s.i. | 4.5 | 28 |
| Volume change,[3] percent | 0 | 0 |

[1] Acid number 0.3 and equivalent weight 244.8.
[2] Acid number 0.3 and equivalent weight 249.8.
[3] See Examples 1 and 2.

Each foam was light tan in color and composed of closed uniform cells. The foam of Example 3 could be used in the manufacture of flotation buoys. The foam of Example 4 could be used for thermal and shock insulation.

*Example 5*

This example demonstrates the preparation of a semi-rigid polyurethane foam using a blend of an epichlorohydrin-terminated poly(9,10-epoxystearic acid) with [N, N,N',N'-tetrakis(2 - hydroxypropyl)]ethylenediamine. A mixture was prepared by blending together 50 parts of an epichlorohydrin - terminated poly(9,10 - epoxystearic acid) having an acid number of 0.2 and an equivalent weight of 250.2, and 50 parts of N,N,N',N'-tetrakis(2-hydroxypropyl)ethylenediamine having an equivalent weight of 73.1, 20 parts of trichlorofluoromethane, 1.25 parts of N,N,N',N'-tetramethyl-1,3-butane diamine and 0.75 part of a nonionic silicone surfactant. To this mixture was rapidly added 62.5 parts of toluene diisocyanate (80:20 mixture of 2,4 to 2,6-toluene diisocyanate) and the entire mixture stirred at high speed for 10 seconds. The mixture was then poured into a mold where it formed a semi-rigid foam. After curing for 24 hours at room temperature, the foam was found to have a density of 1.7 lbs./cu. ft., a compressive strength (10% deflection) of 31.2 p.s.i., a tensile strength of 28 p.s.i. and 0% volume change under the conditions described in Examples 1 and 2. The foam was light tan in color and composed of closed uniform cells.

*Example 6*

This example demonstrates the preparation of a rigid foam using a froth-foaming machine. The machine used had a maximum capacity of 4 lbs./min. and was adapted to deliver three separate streams of ingredients to a mixing head maintained at the pressure of 60 p.s.i.g. In the first stream, 100 parts of an epichlorohydrin-terminated poly(9,10-epoxystearic acid) having an acid number of 0.5 and an equivalent weight of 249.8 and containing one part of a nonionic silicone surfactant and 0.8 part of N, N,N',N'-tetramethyl - 1,3 - butane diamine were metered to the mixing head at a temperature of 49° C. In the second stream, 22 parts of dichlorotetrafluoroethane were metered to the mixing head. The third stream carried 36.8 parts of toluene diisocyanate (80:20 mixture of 2,4 to 2,6-toluene diisocyanate) to the mixing head. The mixture was rapidly stirred by an air driven rotor in the mixing head and then ejected into a mold as a froth. The froth was expanded and hardened to a rigid foam. After curing for 24 hours, the foam was tested and found to have a density of 3.6 lbs./cu. ft., a compressive strength (10% deflection) of 28.8 p.s.i. and a tensile strength of 19 p.s.i. The foam was composed of closed uniform cells and could be used for thermal and shock insulation.

*Example 7*

This example illustrates the preparation of a rigid foam by the quasi-prepolymer method. A quasi-prepolymer with a calculated NCO/OH of 5.5 was prepared by heating and stirring 20 parts of a propylene oxide-terminated poly(9,10-epoxystearic acid) having an acid number of 1.6 and an equivalent weight of 302.3 with 31.8 parts of toluene diisocyanate (80:20 mixture of 2,4 to 2,6-toluene diisocyanate) for one hour. When the thus-prepared quasi-prepolymer cooled to room temperature, 25 parts of trichlorofluoromethane was added with stirring. This quasi-prepolymer mixture containing the halogenated blowing agent was stable and could be stored for long periods of time. A rigid foam was prepared from the quasi-prepolymer by rapidly adding to the mixture an additional 80 parts of the propylene oxide-terminated poly(9,10-epoxystearic acid) described above, 1.0 part of N,N,N',N'-tetramethyl-1,3-butane diamine and 0.6 part of a nonionic silicone surfactant. The resulting mixture was stirred at high speed for 10 seconds and then poured into a mold. After allowing the thus-formed foam to cure for 24 hours, it was tested and found to have a density of 15.7 lbs./cu. ft. The foam was composed of closed uniform cells and could be used in the manufacture of building panels.

Example 8

A quasi-prepolymer with a calculated NCO/OH of 4.5 was prepared by heating and stirring 18.2 parts of an epichlorohydrin-terminated poly(9,10-epoxystearic acid) having an acid number of 0.3 and an equivalent weight of 246.2, and 9.4 parts of triisopropanolamine having an equivalent weight of 63.76 with 73.2 parts of toluene diisocyanate (80:20 mixture of 2,4 to 2,6-toluene diisocyanate). When the quasi-prepolymer cooled to room temperature, 30 parts of trichlorofluoromethane and one part of a nonionic silicone surfactant were added with stirring. This quasi-prepolymer mixture was stable and could be stored for long periods of time. A rigid foam was prepared from the quasi-prepolymer by rapidly adding it to an additional 47.8 parts of the epichlorohydrin-terminated poly(9,10-epoxystearic acid) described above, 24.6 parts of the triisopropanolamine described above and 1.75 parts of triethylene diamine. The resulting mixture was stirred at high speed for 10 seconds and then poured into a mold. After allowing it to cure for 24 hours, it was tested and found to have a density of 2.7 lbs./cu. ft., a compressive strength (10% deflection) of 29.1 p.s.i. and a tensile strenght of 42.6 p.s.i.

Example 9

In this example a foam was prepared from a nonterminated poly(9,10-epoxystearic acid). The following amounts of ingredients were blended for 2 minutes:

| | Parts |
|---|---|
| Poly(9,10-epoxystearic acid)[1] | 100 |
| Nonionic silicone surfactant | 1.1 |
| Dibutyltin dilaurate | 1.0 |
| Triethylamine | 3.1 |
| Alkyl phenoxy poly(oxyethylene ethanol) | 4.4 |
| Water | 6.8 |

[1] Acid number 75.3, oxirane-oxygen 1.84% by weight and equivalent weight 286.5.

To the resulting mixture was added 91.2 parts of toluene diisocyanate and the entire mixture stirred at high speed for 10 seconds. The mixture was then poured into a mold where it formed a rigid foam. The resulting foam had a density of 7.0 lbs./cu. ft., was light tan in color and composed of mostly open cells. The foam could be used for shock insulation.

Example 10

A rigid foam was prepared from a propylene oxide terminated poly(10,11-epoxyundecanoic acid) having an acid number of 1.5, an oxirane-oxygen content of 0.2% by weight and an ester number of 216 by the following method. A mixture was prepared by blending together 100 parts of the end terminated poly(10,11-epoxyundecanoic acid), 91.5 parts of toluene diisocyanate (80:20 mixture of 2,4- to 2,6-toluene diisocyanate) and 0.6 part of a nonionic silicone surfactant and stirring for 2 minutes. Then 4.8 parts of water and 0.6 part of triethylenediamine were rapidly added and the entire mixture stirred at high speed for 10 seconds. The mixture was then poured into a mold where it formed a rigid foam. After curing for 24 hours at room temperature, the foam was found to have a density of 1.7 lbs./cu. ft. a compressive strength (10% deflection) of 13 p.s.i. and a tensile strength of 20 p.s.i. The foam was light tan in color and composed of closed uniform cells.

Example 11

A rigid foam was prepared from the propylene oxide terminated poly(10,11-epoxyundecanoic acid) described in Example 10. The end terminated poly(10,11-epoxyundecanoic acid) blowing agent, catalyst and surfactant were blended with an electric stirer for 2 minutes. Then the toluene diisocyanate was added, and the mixture was stirred at high speed for 10 seconds. The mixture was then poured into a mold where it formed a rigid foam. The foam was allowed to cure for 24 hours at room temperature before testing its physical properties. The amounts of ingredients used (parts by weight) in the preparation of the foam and the density, compressive strength and tensile strength of the resulitng foam are tabulated below.

Ingredients: Parts
- Propylene oxide terminated poly(10,11-epoxyundecanoic acid) _____ 100
- Trichlorofluoromethane _____ 25
- N,N,N',N'-tetramethyl-1,3-butanediamine ____ 1.0
- Nonionic silicone surfactant _____ 0.6
- Toluene diisocyanate (80:20 mixture of 2,4- to 2,6-toluene diisocyanate) _____ 47.2

Properties:
- Density, lbs./cu. ft. _____ 5.2
- Compressive strength (10% deflection), p.s.i. _ 18.5
- Tensile strength, p.s.i. _____ 25

The foam was light tan in color and composed of closed uniform cells. It could be used for thermal and shock insulation.

Example 12

This example illustrates the preparation of a rigid foam by the full prepolymer method. A full prepolymer with a calculated free isocyanate function of 9.5% by weight was prepared by reacting with stirring 100 parts of epichlorohydrin terminated poly(9,10-epoxystearic acid) having an acid number of 5.9 and an equivalent weight of 310 with 53.5 parts of toluene diisocyanate (80:20 mixture of 2,4- to 2,6-toluene diisocyanate) at a temperature of 35–37° C. A rigid foam was prepared from the full prepolymer by rapidly adding a mixture of 2.9 parts of water, 0.25 part triethylene diamine, 0.5 part of nonionic silicone surfactant and stirring at high speed for 5 seconds. The mixture was then poured into a mold where it formed a rigid foam. After curing for 24 hours at room temperature, the foam was tested and found to have a density of 5.8 lbs./cu. ft. It was light tan in color, had small closed cells and did not change in volume on humid aging. The foam could be used in the manufacture of toys.

This application is a continuation-in-part of my copending application Serial No. 141,020, filed September 27, 1961.

What I claim and desire to protect by Letters Patent is:

1. A polyurethane foam comprising the foamed reaction product of an organic polyisocyanate, a blowing agent and a polyol containing at least 10% by weight of a linear polymeric ester having the general formula:

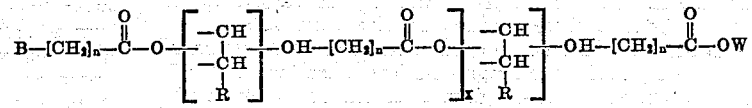

in which R is a substituent of the group consisting of hydrogen and alkyl radicals; $n$ is a whole number from 0 to 20, inclusive; $x$ is at least 1; W is a substituent of the group consisting of hydrogen, hydroxyalkyl radicals and halohydroxyalkyl radicals; and B is a substituent of the group consisting of

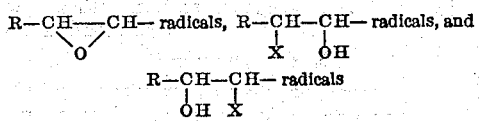

in which R has the same significance as set forth above, and X is a halogen substituent.

2. A polyurethane foam comprising the foamed reaction product of an organic polyisocyanate, a blowing agent and a polyol containing at least 25% by weight of a linear polymeric ester having the general formula:

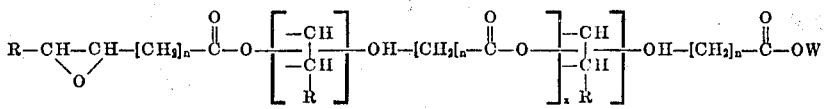

in which R is a substituent of the group consisting of hydrogen and alkyl radicals; $n$ is a whole number from 0 to 20, inclusive; $x$ is at least 1; and W is a substituent of the group consisting of hydrogen, hydroxyalkyl radicals and halohydroxyalkyl radicals.

3. The product of claim 2 wherein the polyol is epichlorohydrin-terminated poly(9,10-epoxystearic acid).

4. The product of claim 2 wherein the polyol is propylene oxide-terminated poly(9,10-epoxystearic acid).

5. The product of claim 2 wherein the polyol is propylene oxide - terminated poly(10,11 - epoxyundecanoic acid).

6. The product of claim 2 wherein the polyol is a mixture of epichlorohydrin-terminated poly(9,10-epoxystearic acid) and [N,N,N',N'-tetrakis(2-hydroxypropyl)] ethylenediamine.

7. A rigid polyurethane foam comprising the foamed reaction product of a toluene diisocyanate, epichlorohydrin-terminated poly(9,10-epoxystearic acid) and a low-boiling halogenated hydrocarbon liquid, said foam having a closed cell content of at least 90%.

8. In the process of preparing a polyurethane foam comprising reacting the following ingredients: (1) a polyol, (2) an organic polyisocyanate, (3) a blowing agent, (4) a catalyst, and (5) a surfactant, the improvement of using a polyol containing at least 10% by weight of a linear polymeric ester having the general formula:

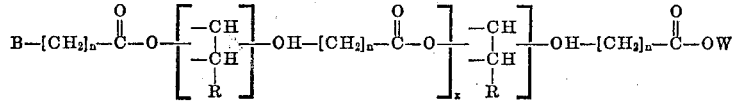

in which R is a substituent of the group consisting of hydrogen and alkyl radicals; $n$ is a whole number from 0 to 20, inclusive; $x$ is at least 1; W is a substituent of the group consisting of hydrogen, hydroxyalkyl radicals and halohydroxyalkyl radicals; and B is a substituent of the group consisting of

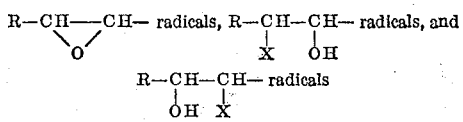

in which R has the same significance as set forth above, and X is a halogen substituent.

References Cited by the Examiner
UNITED STATES PATENTS 3,075,926  1/36  Stewart et al. _____ 260—2.5
3,112,325  11/63  Murata et al. _____ 260—348

LEON J. BERCOVITZ, *Primary Examiner.*

DONALD E. CZAJA, *Examiner.*

UNITED STATES PATENT OFFICE
CERTIFICATE OF CORRECTION

Patent No. 3,184,420　　　　　　　　　　　　　　　　May 18, 1965

Karl Brack

It is hereby certified that error appears in the above numbered patent requiring correction and that the said Letters Patent should read as corrected below.

Column 1, lines 50 to 55, the formula should appear as shown below instead of as in the patent:

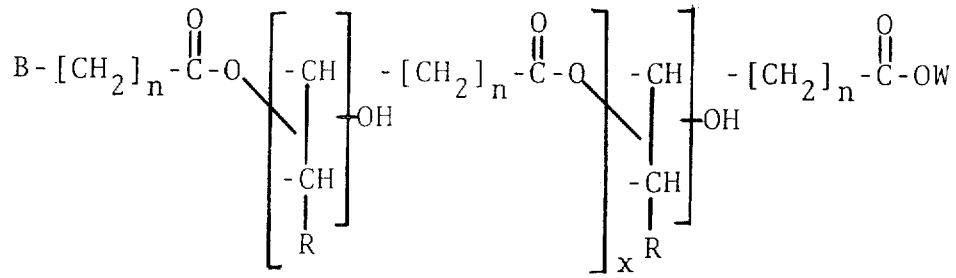

column 8, lines 60 to 64, the formula should appear as shown below instead of as in the patent:

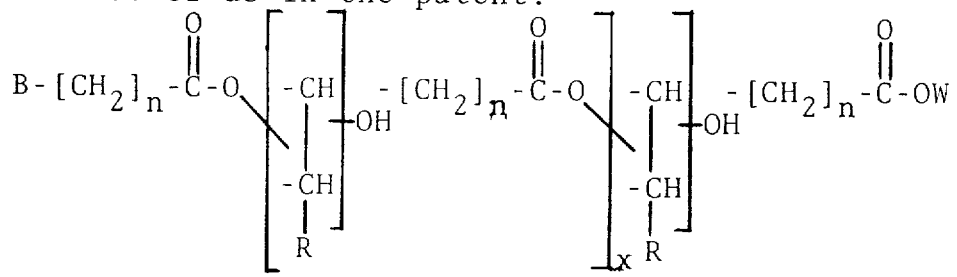

column 9, lines 12 to 16, the formula should appear as shown below instead of as in the patent:

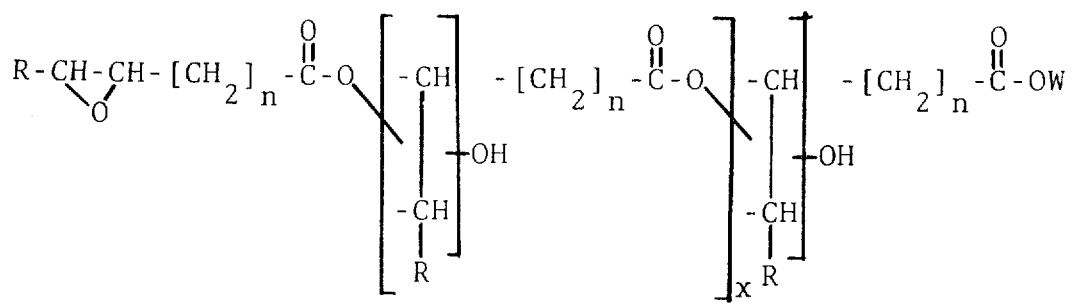

column 10, lines 6 to 10, the formula should appear as shown below instead of as in the patent:

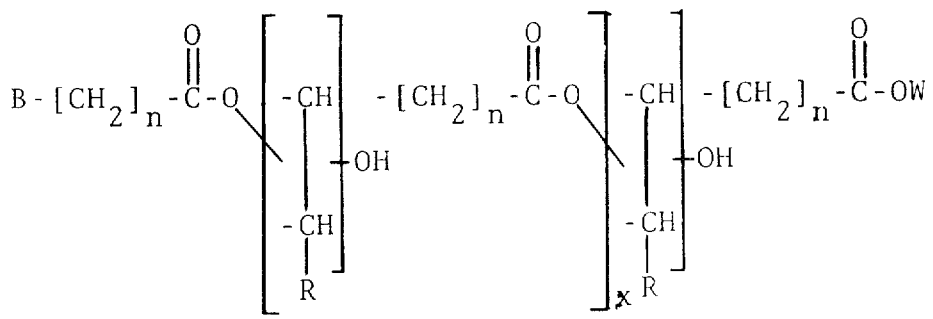

Signed and sealed this 28th day of December 1965.

(SEAL)
Attest:

ERNEST W. SWIDER
Attesting Officer

EDWARD J. BRENNER
Commissioner of Patents